United States Patent
Lutz, III

[11] Patent Number: 6,065,897
[45] Date of Patent: May 23, 2000

[54] ROLLER LOCKING MECHANISMS

[75] Inventor: Peter J. Lutz, III, Macomb, Mich.

[73] Assignee: E & E Engineering, Inc., Warren, Mich.

[21] Appl. No.: 09/023,135

[22] Filed: Feb. 12, 1998

[51] Int. Cl.[7] .................................................. B25G 3/18
[52] U.S. Cl. .................. 403/325; 403/322.4; 403/322.2; 269/234; 254/104
[58] Field of Search ................................ 403/321, 322.1, 403/322.4, 322.2, 325, 104, 105, 109.5, 109.3, 110; 269/234, 236, 217, 254 CS; 254/104

[56] References Cited

U.S. PATENT DOCUMENTS

| | | |
|---|---|---|
| 584,829 | 6/1897 | Randolph . |
| 631,991 | 8/1899 | James et al. . |
| 1,031,637 | 7/1912 | Fischer ................................ 403/104 X |
| 1,390,189 | 9/1921 | Bixler et al. . |
| 2,348,611 | 5/1944 | Davidson ............................ 403/321 X |
| 2,794,356 | 6/1957 | Roberson ..................................... 81/31 |
| 2,800,819 | 7/1957 | Smith ........................................... 81/17 |
| 3,630,512 | 12/1971 | Paret ........................................ 269/138 |
| 3,991,964 | 11/1976 | Christopher .......................... 248/354 R |
| 4,179,225 | 12/1979 | Asplund ............................... 403/322.4 |
| 4,244,618 | 1/1981 | Boyer et al. ........................ 269/234 X |
| 4,257,315 | 3/1981 | Tisell et al. ................................. 92/26 |

*Primary Examiner*—Lynne H. Browne
*Assistant Examiner*—David E. Bochna
*Attorney, Agent, or Firm*—Gifford, Krass, Groh, Sprikle, Anderson & Citkowski, P.C.

[57] ABSTRACT

The present invention is a locking mechanism which utilizes rolling members positioned on recessed inclined surfaces, the rolling members being biased toward a locked position wherein the rolling members engage both the inclined surface of the locking mechanism and an engagement surface of a member or workpiece disposed above and positioned proximate to the recess. Each rolling member is moved from its locked position to its unlocked position along its respective inclined surface by a lever pivotably mounted to the locking mechanism and engaging the rolling member.

6 Claims, 3 Drawing Sheets

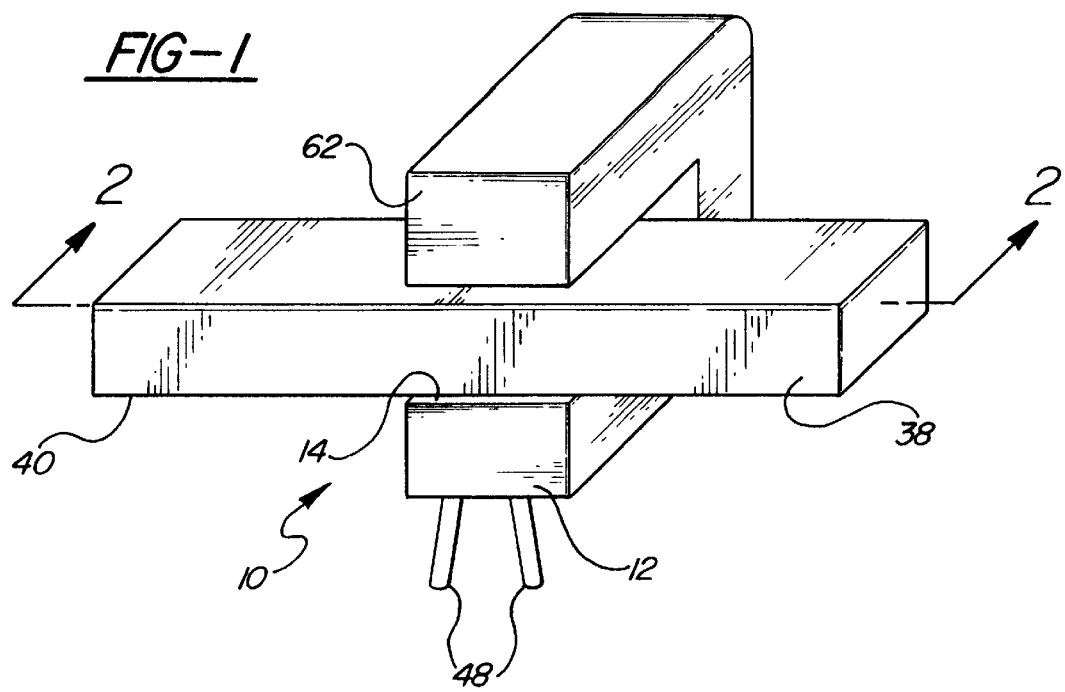
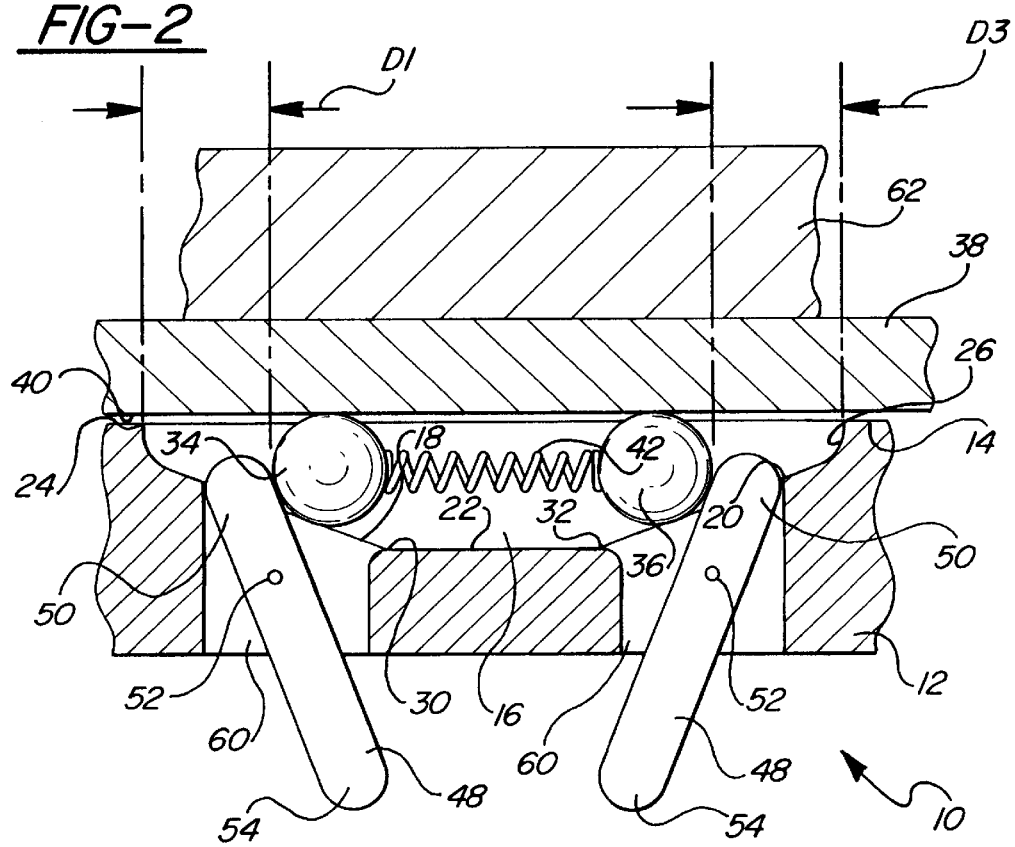

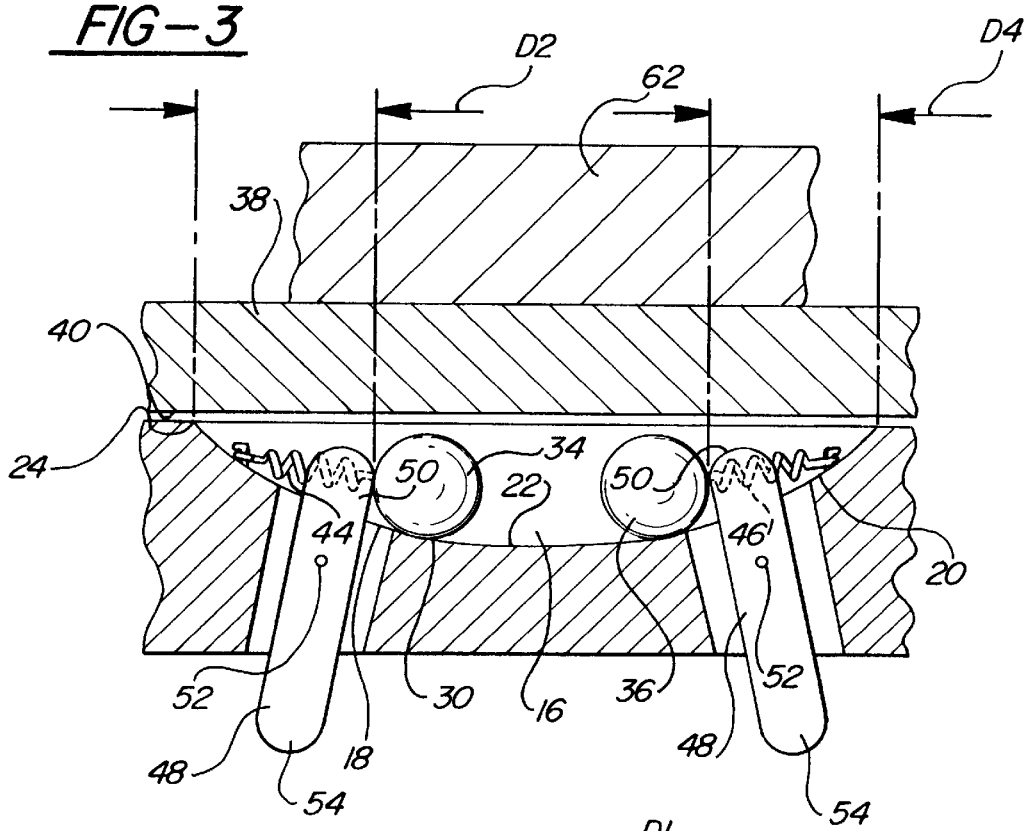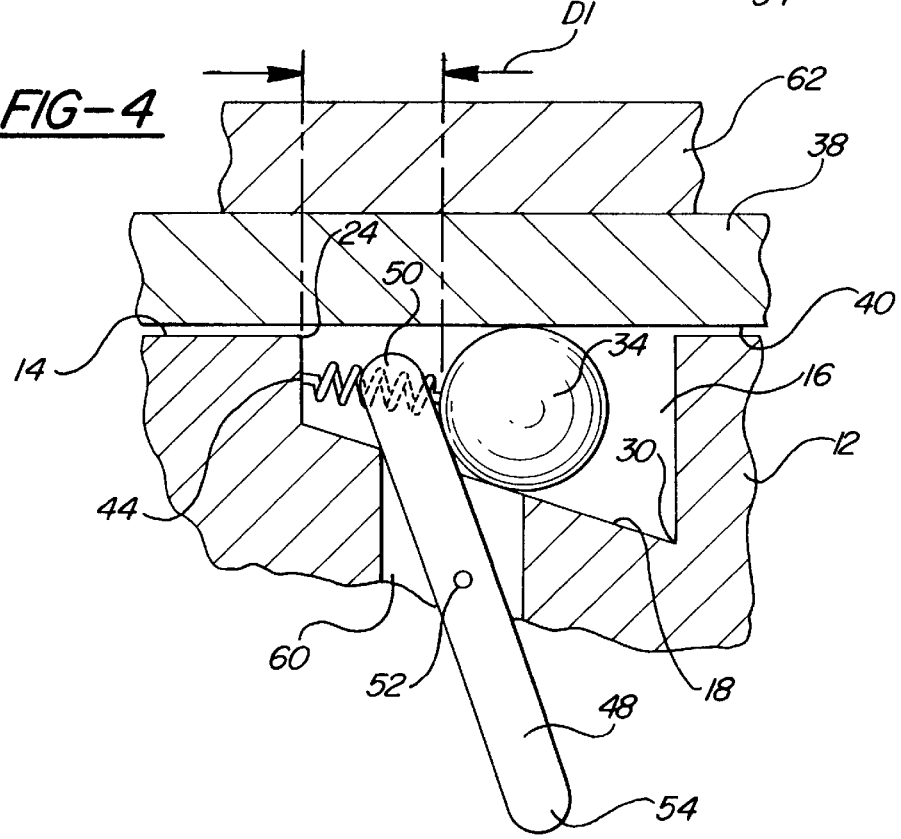

ROLLER LOCKING MECHANISMS

FIELD OF THE INVENTION

The present invention relates generally to locking mechanisms, and more particularly to locking mechanisms reversibly immobilizing one member relative to another.

BACKGROUND OF THE INVENTION

It is often necessary to selectively immobilize one member relative to another, and it is often desirable that such immobilization be selectably terminated, so that the member may be adjusted, repositioned, etc. There are a wide variety of mechanisms available which allow one member to be locked into a variety of positions with respect to another.

A subset of such locking members utilizes a rolling member such as a ball which is moveable along a ramp associated with one of the members, and which wedges the members together so that they are immobilized relative to one another. Such devices lock in only one direction since motion of the ball down the ramp will free the members allowing them to move.

The movement of the rolling members between their wedged and free positions are typically accomplished by a complex interaction of mechanical elements. The prior art does not provide a simple locking mechanism by which two members may be reversibly immobilized relative to one another, in two directions of travel.

At least one prior art device attempts to provide a simple locking mechanism utilizing rollers. U.S. Pat. No. 1,390,189 to Bixler et al. discloses a vice post including two telescoping pipes which are releasably locked into position by a locking mechanism or clutch which is carried by the lower section of pipe, the clutch engaging the upper section of pipe. Once locked, the locking mechanism prevents the upper section of pipe from moving downward. The clutch includes a sleeve having a pocket with slots extending at right angles thereto. The pocket and slots extend along the clutch and pipe sections and are inclined inward toward the pipe sections. A roller having a stem extending perpendicularly to the roller and outwardly from the center of the roller is placed in the pocket so that the stem extends through the slots, the roller engaging the lower section of pipe. As the roller is moved downward, the inclined surface of the pocket brings the roller into engagement with the upper section of pipe, wedging the roller between the inclined surface and the upper section, thus preventing downward movement of the upper pipe. To release the upper section of pipe, the stem extending outwardly from the roller is grasped and drawn upward, moving the roller upwardly against the incline and out of engagement with the upper section of pipe. Unfortunately, the Bixler et al. device does not permit easy disengagement of the rolling member from its locked position as the force required to move the rolling member from its locked position is significant. Thus, there remains a need for a simple, hand operable locking mechanism of the aforementioned type which prevents movement in two directions.

SUMMARY OF THE INVENTION

The present invention overcomes problems of the prior art by providing a locking mechanism utilizing rolling members positioned on recessed inclined surfaces, the rolling members biased toward a locked position wherein the rolling members engage both the inclined surface of the locking mechanism and an engagement surface of a workpiece disposed above and positioned proximate to the recess. A support is in mechanical communication with the locking mechanism, the workpiece being disposed between the support and the locking mechanism. The support prevents the workpiece from moving out of engagement with the rolling members when such rolling members are in their locked positions. The rolling members are preferably moved from their locked position to their unlocked position by a lever pivotably mounted to the locking mechanism.

In the preferred embodiment of the present invention, the locking mechanism includes a base having a first surface. A recess is formed in the first surface of the base, the recess being bounded by a first and second inclined wall. Each inclined wall has an upper end commencing at the first surface of the base and a lower end. The recess preferably includes a bottom surface which is disposed between the lower ends of the inclined walls, the inclined surfaces being inclined in opposite directions.

A first elongated roller, preferably having a solid circular cross-sectional area, is disposed within the recess and is moveable upon the first inclined wall between a locked position, wherein the first roller is spaced apart from the upper end of the first inclined wall by a distance D1, and an unlocked position wherein the first roller is spaced apart from the upper end of the first inclined wall by a distance D2 which is greater than D1. A second elongated roller, preferably having a solid circular cross-sectional area, is also disposed within the recess and is moveable upon the second inclined wall between a locked position, wherein the second roller is spaced apart from the upper end of the second inclined wall by a distance D3, and an unlocked position wherein the second roller is spaced apart from the upper end of the second inclined wall by a distance D4 which is greater than D3.

The first and second rollers are biased toward their respective locked positions. While such biasing may be accomplished by a variety of mechanisms, the first and second rollers are preferably biased toward their respective locked positions by a spring. In the preferred embodiment, a compression spring is positioned between and in mechanical communication with the first and second rollers, thereby forcing the first and second rollers up their respective inclined walls toward their locked positions.

In each embodiment, unlocking means for overcoming the bias of the first and second rollers toward their locked positions are provided, such means moving the rollers toward their respective unlocked positions. Preferably, such means provide a mechanical advantage to a user to reduce the force required to move the rollers toward their respective unlocked positions. The mechanical advantage gained by utilizing a mechanism such as a lever is significant as it enables a user to overcome the inherently large engagement forces between the member or workpiece, rolling member, and inclined wall of the base. In the preferred embodiment, such means includes a pair of levers, each lever having an inner end in mechanical communication with the respective roller and outer end which extends exteriorly of the locking mechanism. Each lever is pivotably mounted to the base. As each lever is pivoted, the inner end of the lever engages a roller, forcing it downward along the inclined wall to its unlocked position. The outer end of each lever is preferably configured as a handle allowing the lever to be easily grasped by a user.

In one such embodiment, the levers are positioned within an aperture extending from a second side of the base, the aperture in communication with the recess. In this embodiment, the levers extend through the aperture from the exterior of the base into the recess for engagement with the rollers.

In the preferred embodiment, the use of two opposing rollers positioned on oppositely inclining surfaces prevents movement of the workpiece in two directions relative to the locking mechanism. In alternate embodiments, the locking mechanism may be configured to prevent movement of the workpiece in a single direction. In these embodiments, the recess has only one inclined wall, such inclined wall having an upper end commencing at the first surface of the base and the lower end spaced apart from the first surface of the base. An elongated roller having a circular cross-section is disposed on this inclined surface in a manner similar to the prior embodiment, the roller being biased toward its locked position wherein the roller is spaced from the upper end of the inclined wall by a distance D1, the roller being in its unlocked position when the roller is spaced apart from the upper end of the inclined wall by a distance D2 which is greater than D1. In such an embodiment, the roller may be biased towards its locked position by positioning a spring between and in mechanical communication with the roller and the upper end of the inclined wall. Such a configuration of springs and rollers may be utilized in the embodiment having two rollers, a spring being disposed between and in mechanical communication with each roller and the upper end of the respective inclined wall.

Other objects, advantages and applications of the present invention will be made clear by the following detailed description of a preferred embodiment of the invention. The description makes reference to drawings in which:

BRIEF DESCRIPTION OF THE DRAWINGS

FIG. 1 is a perspective view of an embodiment of the present invention;

FIG. 2 is a partial cross-sectional view of the embodiment depicted in FIG. 1 taken along Lines 2—2;

FIG. 3 is a partial cross-sectional view of an alternate embodiment of the present invention;

FIG. 4 is a partial cross-sectional view of another alternate embodiment of the present invention, the rolling member being positioned in its locked position;

DETAILED DESCRIPTION

Figure 5:
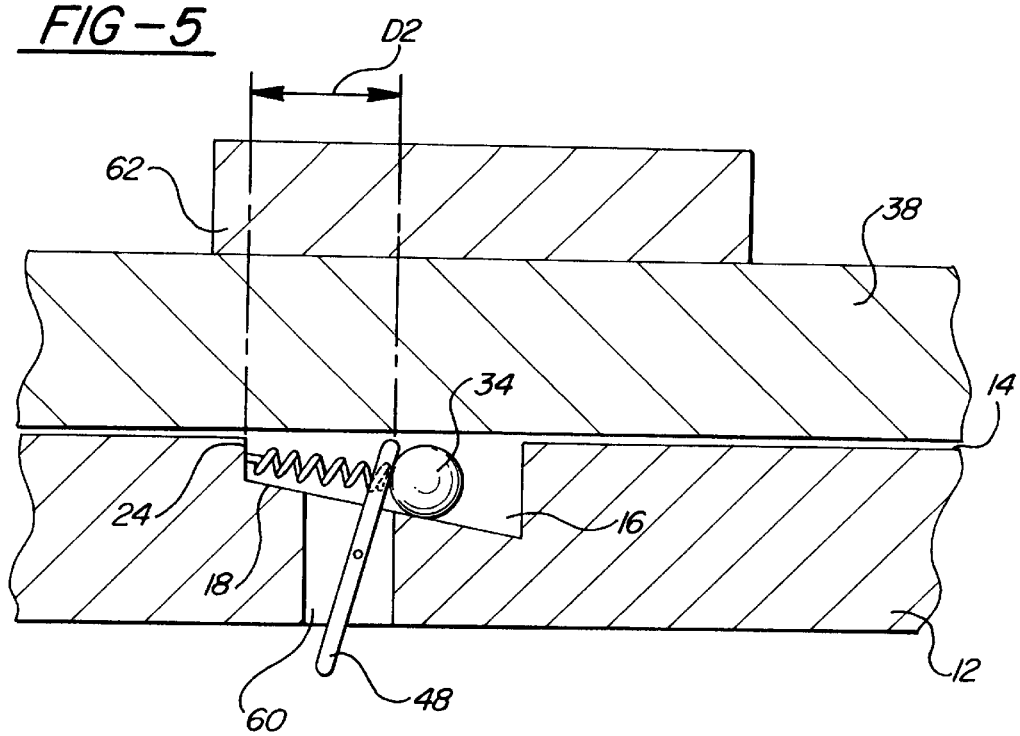
FIG. 5 is a similar partial cross-sectional view of the embodiment depicted in FIG. 4, the rolling member being positioned in its unlocked position.

The present invention overcomes disadvantages of the prior art by providing a locking mechanism wherein rolling members which are positionable along inclined surfaces are utilized to lock a member, referred to herein as a workpiece, into fixed engagement with the locking mechanism. In the locking mechanism of the present invention, the rolling members can be easily disengaged from their locked position, allowing for the ready repositioning of the workpiece relative to the locking mechanism.

A locking mechanism of the present invention is depicted in FIG. 1 at 10, and comprises a base 12 having a first surface 14. A workpiece 38 is positioned between locking mechanism 10 and a support 62, which is in mechanical communication with the base 12. Workpiece 38 has an engagement surface 40 positioned proximate to the first surface 14 of base 12. The support 62 is configured to prevent workpiece 38 from moving out of engagement with locking mechanism 10. The distance between support 62 and base 12 is preferably adjustable to accommodate a variety of workpiece shapes and sizes. The structure of the support 62 may be varied considerably from the embodiments disclosed herein and still perform its intended function.

As shown in the preferred embodiment depicted in FIG. 2, a recess 16 is formed in the first surface 14 of the base 12. The recess 16 is bounded by a first inclined wall 18 and a second inclined wall 20. Each inclined wall 18 and 20 has an upper end and a lower end, the lower ends of the inclined walls being preferably spaced apart from each other by a bottom surface 22. The first inclined wall 18 has an upper end 24 commencing at the first surface 14 of the base 12 and a lower end 30 commencing at the bottom surface 22 of recess 16. The second inclined wall 20 has an upper end 26 commencing at the first surface 14 of base 12 and a lower end 32 commencing at the bottom surface 22 of recess 16. In alternate embodiments, the lower ends of the inclined walls may meet at a bottom point of the recess.

In the preferred embodiment, a pair of rollers 34 and 36 are provided, each roller preferably being an elongated, cylindrical member having a solid, circular cross-section, although alternate configurations such as balls and the like may be utilized. The first roller 34 is disposed within recess 16 and is moveable upon the first inclined wall 18 between a locked position and an unlocked position. The second roller 36 is also disposed within recess 16 upon the second inclined wall 20 and is moveable thereupon between a locked position and an unlocked position. As described in detail below, each roller is biased toward its locked position.

When rollers 34 and 36 are in their locked positions, the rollers are spaced apart from the upper end of their respective inclined wall by a distance D1 and D3, respectively, so that each roller engages both an inclined wall and the engagement surface 40 of workpiece 38. When rollers 34 and 36 are in their unlocked positions, the rollers are spaced apart from the upper end of their respective inclined wall by a distance D2 and D4, respectively. The distance D2 is greater than the distance D1. Likewise, the distance D4 is greater than distance D3. Thus, in their unlocked positions, the rollers are positioned sufficiently downward on their respective inclined surfaces so that each roller is spaced apart from and no longer engages the workpiece 38. As shown in FIG. 2, rollers 34 and 36 are in their locked positions, roller 34 being spaced apart from the upper end 24 of first inclined surface 18 by a distance D1. Likewise, roller 36 is spaced apart from the upper edge 26 of inclined surface 20 by a distance D3. In the alternate embodiment depicted in FIG. 3, rollers 34 and 36 are shown in their unlocked positions, roller 34 being spaced apart from the upper end 24 of inclined surface 18 by a distance D2. Roller 36 is spaced apart from upper end 26 of inclined surface 20 by a distance D4. In each embodiment, the distance between the roller and the upper end of its respective inclined surface when the roller is in its locked position is less than the distance between the roller and the upper end of its respective inclined surface when the roller is in its unlocked position. As shown in FIGS. 4 and 5, the distance D2, which is the distance between the upper end of the inclined surface 18 and roller 34 in its unlocked position, is greater than the distance D1 depicted in FIG. 4, which is the distance between roller 34 and the upper end 24 of inclined surface 18 when the roller is in its locked position.

Thus, movement of workpiece 38 is prevented as each roller is "wedged" between its respective inclined surface and engagement surface 40, forcing workpiece 38 into engagement with support 62. In the embodiments depicted in FIGS. 2 and 3, movement of workpiece 38 in either direction increases the engagement forces between one of the rollers, its respective inclined surface and engagement surface 40. For example, in the embodiment depicted in FIG. 2, movement of workpiece 38 toward the first roller 34 in a direction parallel to the first surface forces first roller 34 upward along inclined surface 14, thereby increasing the engagement force between workpiece 38 and the locking mechanism 10. Similarly, movement of workpiece 38 toward the second roller 36 in a direction parallel to the first surface 14 forces second roller 36 upward along inclined surface 20, also increasing the engagement force between workpiece 38 and the locking mechanism 10.

In the embodiment depicted in FIG. 2, rollers 34 and 36 are biased towards their locked positions by a spring 42 positioned between and in mechanical communication with the first and second rollers 34 and 36. Spring 42 is a compression spring which forces rollers 34 and 36 away from each other and upward along their respective inclined walls toward their locked positions.

To move rollers 34 and 36 out of engagement with the engagement surface 40 toward their respective unlocked positions, two levers 48 are provided in the preferred embodiment, each lever having an inner end 50 and an outer end 54 . Each lever 48 is pivotably mounted to the base 12 at a pivot point 52 by mechanical means such as a pin. Preferably, pivot point 52 is positioned as shown in FIG. 2, providing a mechanical advantage to the user. The outer end 54 of each lever 48 is disposed exteriorly of the base and, in the preferred embodiment, is configured to be grasped by a user.

Each lever 48 is moveable between a first position and a second position, the first position of each lever being that position wherein the inner end 50 of the lever 48 applies insufficient mechanical force to the respective roller to overcome the outwardly biasing force of spring 42. Thus, when each lever is in its first position, the rollers 34 and 36 are biased by spring 42 into their locked positions.

When each lever is in its second position, each lever 48 applies sufficient mechanical force to its respective roller to force such roller downward along its respective inclined surface to its unlocked position. In the embodiment depicted in FIG. 2, each lever 48 is mounted in an aperture 60 extending from a second side of the base 12, the aperture being in communication with the recess 16.

In an alternate embodiment depicted in FIG. 3, a first spring 44, disposed between and in mechanical communication with both the first roller 34 and the first inclined wall 18, biases roller 34 towards its locked position. A second spring 46, disposed between and in mechanical communication with both the second roller 36 and second inclined wall 20, biases roller 36 towards its locked position. Thus, springs 44 and 46 perform the function that spring 42 did in the embodiment depicted in FIG. 2, springs 44 and 46 drawing rollers 34 and 36 up their respective inclined surfaces toward their locked positions. The embodiment depicted in FIG. 3 operates in a manner similar to the embodiment in FIG. 2 in that levers 48, having their inner ends 50 in mechanical communication with rollers 34 and 36, are moveable between a first and second position. Thus, levers 48 are utilized to overcome the biasing force of springs 44 and 46 to move the rollers 34 and 36 from their locked positions to their unlocked positions.

An alternate embodiment of the present invention is depicted in FIGS. 4 and 5, which utilizes only one roller in conjunction with one lever and one spring biasing the roller towards its locked position. FIG. 4 depicts the locking mechanism in its locked position, and FIG. 5 depicts the locking mechanism in its unlocked position, with each element performing a function similar to the function such element performed in the embodiments depicted in FIGS. 2 and 3. In the embodiment of FIGS. 4 and 5, movement between the locking mechanism 10 and workpiece 38 is prevented only in the direction parallel to the first surface 14 and toward the uppermost end of the inclined wall.

Figure 6:
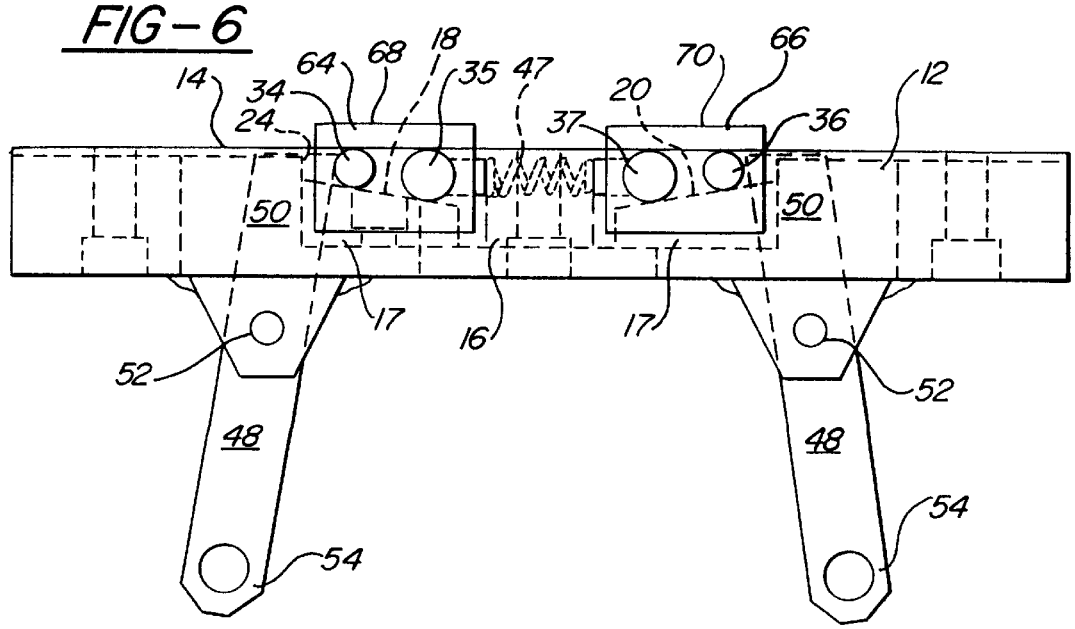
FIG. 6 is a side elevational view of another alternate embodiment of the present invention.

Another preferred embodiment of the present invention is depicted in FIG. 6. Like the embodiment of FIGS. 1 and 2, this embodiment includes a base 12 having a first surface 14, and a recess 16 formed in the first surface 14 bounded by a first and a second inclined wall 18 and 20. This embodiment also includes a first and a second roller 34 and 36 and a pair of disengagement levers 48. Unlike the earlier embodiments, the embodiment of FIG. 6 further includes a third roller 35, a fourth roller 37, and a first and second slide plate 64 and 66. The third roller 35 is disposed within recess 16 upon the first inclined wall 18 at a position spaced apart from first roller 34 and further from the upper end 24 of the wall 18. The third roller 35 is of larger diameter than first roller 34. Likewise, the fourth roller 37 is disposed within recess 16 upon the second inclined wall 20 at a position spaced apart from the second roller 36 and further from the upper end 26 of the wall 20. The fourth roller 37 is of larger diameter than second roller 36. The slide plates 64 and 66 are preferably rectangular pieces of solid metal located generally in a plane perpendicular to first surface 14. The plates 64 and 66 reside at least partially within the recess 16 and may extend upwardly out of the recess and above first surface 14 depending upon their position. Unlike the earlier embodiments, the recess 16 in this embodiment includes a well portion 17 adjacent the first and second inclined walls 18 and 20 to provide clearance for the plates 64 and 66. The plates 64 and 66 also have upper surfaces 68 and 70 respectively which are generally parallel to first surface 14. First plate 64 is in mechanical communication and interconnected with first and third rollers 34 and 35 such that the first and third rollers and the first plate 64 move together. Consequently, as the rollers 34 and 35 move up the first inclined wall 18 toward the upper end 24, the first plate 64 moves toward the upper end 24 and moves upwardly such that the upper surface 68 of the plate extends above the first surface 14 of the base 12. This allows the first slide plate 64 to engage a workpiece (not shown) trapped between a support (not shown) and the upper surface 68 of the plate 64. Likewise, second slide plate 66 is in mechanical communication and interconnected with second and fourth rollers 36 and 37 such that the three pieces move together.

A compression spring 47, shown schematically, is positioned between and in mechanical communication with first and second slide plates 64 and 66 so as to bias them apart. Thereby, the rollers associated with each slide plate are also biased apart so that each is biased up their respective inclined wall and into a locked position. Alternatively, the spring 47 can be in mechanical communication either with the first and second rollers 34 and 36, or with the third and fourth rollers 35 and 37. Either of these arrangements will accomplish the same result; the rollers will be biased toward a locked position.

In the embodiment of FIG. 6, the levers 48 include inner ends 50 which act on the first and second rollers 34 and 36 when a force is exerted on the outer ends 54 of the levers 48. When the levers 48 act on the first and second rollers 34 and 36, the first and second slide plates 64 and 66 are forced toward each other thereby unlocking the workpiece. Alternatively, the levers 48 may act directly on the slide plates 64 and 66 or on the third and fourth rollers 35 and 37.

The embodiment of FIG. 6 can be altered in several ways to accommodate different applications and still perform its intended function. For example, the slide plates 64 and 66 may be non-rectangular or may have upper surfaces 68 and 70 which are shaped to engage a particular workpiece. The upper surface 68 and 70 also may be non-parallel to the first surface 14 of the base 12. The slide plates 64 and 66 may also be eliminated or reduced in size so that the four rollers 34–37 directly engage the workpiece. Alternatively, a plurality of slide plates may be included and be positioned at various locations along the lengths of the rollers to spread out the engagement with the workpiece. The upper surfaces of the slide plates may all be of the same height or may be of various heights and shapes to accommodate a particular workpiece.

A significant advantage of the present invention is its simplicity and ease of use, the lever 48 providing a mechanical advantage to a user, enabling the user to easily overcome the locking forces applied to the roller by the inclined surface and engagement surface 40 when the locking mechanism is in its locked position. Thus, the present invention provides a simple and easy to use locking mechanism having the advantages of roller locking mechanisms.

Having described the various embodiments of the present invention with reference to the accompanying figures, it will be appreciated that various changes and modifications can be made without departing from the scope or spirit of the invention.

I claim:

1. A locking mechanism comprising:

a base having a first surface;

a recess formed in the first surface of the base, the recess being bounded by a first and second inclined wall, each inclined wall having an upper end commencing at the first surface of the base;

a first roller disposed within the recess and moveable upon the first inclined wall between a locked position wherein the first roller is spaced from the upper end of the first inclined wall by a distance D1 and an unlocked position wherein the first roller is spaced apart from the upper end of the first inclined wall by a distance D2 which is greater than D1;

a second roller disposed within the recess and moveable upon the second inclined wall between a locked position wherein the second roller is spaced from the upper end of the second inclined wall by a distance D3 and an unlocked position wherein the second roller is spaced apart from the upper end of the second inclined wall by a distance D4 which is greater than D3;

biasing means for urging the first and second rollers toward their respective locked positions;

unlocking means for overcoming the biasing means and urging the rollers to their unlocked positions said unlocking means including a first and second lever, each lever having an inner end and an outer end, each outer end disposed exteriorly of the base, each lever being pivotably mounted to the base, the inner end of the first lever being in mechanical communication with the first roller, the inner end of the second lever being in mechanical communication with the second roller, each lever being operable to urge its respective roller toward its unlocked position and a workpiece, moveable with respect to the base, the workpiece having an engagement surface disposed proximate to the first surface of the base, the workpiece being disposed so that the first and second rollers, in their respective locked positions, engage the engagement surface of the workpiece and the first and second inclined walls of the recess, respectively, so as to prevent relative movement between the workpiece and the base, and the first and second rollers, in their respective unlocked positions, do not engage the engagement surface of the workpiece, thereby permitting relative movement between the workpiece and the base.

2. The locking mechanism of claim 1 wherein the outer end of each lever is configured to be grasped by a user.

3. The locking mechanism of claim 1 wherein the levers are pivotably mounted to the base to provide a mechanical advantage to the user.

4. A locking mechanism comprising:

a base having a first surface;

a recess formed in the first surface of the base, the recess bounded by a first and second inclined wall, each inclined wall having an upper end commencing at the first surface of the base;

a first roller disposed within the recess and moveable upon the first inclined wall between a locked position wherein the first roller is spaced from the upper end of the first inclined wall by a first distance D1 and an unlocked position wherein the first roller is spaced apart from the upper end of the first inclined wall by a second distance D2 which is greater than D1;

a second roller disposed within the recess and moveable upon the second inclined wall between a locked position wherein the second roller is spaced from the upper end of the second inclined wall by a distance D3 and an unlocked position wherein the second roller is spaced apart from the upper end of the second inclined wall by a distance D4;

biasing means for urging the first and second rollers toward their respective locked positions;

a first lever pivotably mounted to the base, the first lever being in mechanical communication with the first roller and operable to bias the first roller toward its unlocked position;

a second lever pivotably mounted to the base, the second lever being in mechanical communication with the second roller and operable to bias the second roller toward its unlocked position;

a workpiece, moveable with respect to the base, the workpiece having an engagement surface, the engagement surface disposed proximate to the first surface of the base, the workpiece being disposed so that the first and second rollers, in their respective locked positions, engage the engagement surface of the workpiece and the first and second inclined walls of the recess, respectively, so as to prevent relative movement between the workpiece and base, and the first and second rollers, in their respective unlocked positions, do not engage the engagement surface of the workpiece, thereby permitting relative movement between the workpiece and the base.

5. The locking mechanism of claim 4 wherein the biasing means includes a compression spring positioned between and in mechanical communication with the first and second rollers.

6. The locking mechanism of claim 4 wherein the biasing means includes a first and second spring, the first spring disposed between and in mechanical communication with the first roller and first inclined wall, the second spring being disposed between and in mechanical communication with the second roller and second inclined wall.

\* \* \* \* \*